(12) United States Patent
Wada et al.

(10) Patent No.: US 6,568,320 B2
(45) Date of Patent: May 27, 2003

(54) HEAT TRANSFER PRINTING DEVICE AND METHOD FOR PRINTING ON TOROIDAL-SHAPED BODIES

(75) Inventors: Mitsunori Wada, Iruma (JP); Takayuki Kojio, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/878,945

(22) Filed: Jun. 13, 2001

(65) Prior Publication Data

US 2002/0005123 A1 Jan. 17, 2002

(30) Foreign Application Priority Data

Jun. 16, 2000 (JP) .................................. 2000-182111
May 8, 2001 (JP) .................................. 2001-137115

(51) Int. Cl.[7] .............................................. B41F 17/34
(52) U.S. Cl. ........................ 101/35; 101/41; 101/44; 101/487; 101/407.1; 101/DIG. 30; 101/492
(58) Field of Search ........................... 101/33, 34, 35, 101/41, 42, 43, 44, 487, 488, 493, DIG. 30, DIG. 39, DIG. 40, 407.1, 492; 400/120.01; 347/171

(56) References Cited

U.S. PATENT DOCUMENTS 4,397,710 A * 8/1983 Gaylord ........................ 101/33
5,729,272 A * 3/1998 Kikuchi ....................... 156/230
6,144,033 A * 11/2000 Kokubu et al. .......... 250/358.1

FOREIGN PATENT DOCUMENTS

EP 0 945 820 A2 * 9/1999

* cited by examiner

Primary Examiner—Leslie J. Evanisko
(74) Attorney, Agent, or Firm—Sughrue Mion, PLLC

(57) ABSTRACT

A tire, for example, is nipped by a pair of bead portion support members and filled with an internal pressure. Logo marks printed on a transfer film are positioned in front of the tire at a transfer position at which the logo marks are to be transferred or printed to the tire. The transfer film is pressed by thermal plates onto the side portions of the tire so that the logo marks are transferred onto the side portions thereof. In short, the present invention provides a printing device and a printing method capable of effectively printing clear indications on the side portions of a toroidal-shaped body such as a tire.

19 Claims, 5 Drawing Sheets

HEAT TRANSFER PRINTING DEVICE AND METHOD FOR PRINTING ON TOROIDAL-SHAPED BODIES

BACKGROUND OF THE INVENTION

1. Field of the Invention

The present invention relates to a printing device for a toroidal-shaped body and a printing method by using the same. More specifically, the present invention relates to a printing device which can effectively print indications such as letters, patterns, logo marks, numerals, and bar codes on the side portions of a toroidal-shaped body such as a tire, a tube, a roll, or the like.

2. Description of the Related Art

For example, as a method of printing white logo marks or the like on the side portions of the tire, there have been proposed a printing method of using a silk screen, a heat-printing method, a template printing method, a printing method of using a rubber-pad, and the like.

In the printing method of using a silk screen, as printing is usually carried out by using a cloth spread on a flat surface, it is difficult to print indications or the like on a curved surface (where printing is to be carried out) on the side portions of the tire.

In the heat-printing method, as a letter plate made of rubber on which a rubber paste has been applied is set on the surface of the tire and the rubber paste is vulcanized to thereby be converted into a rubber elastic body, there is a problem that, due to the heat during the vulcanization of the tire, organic fibers inside of the tire are subjected to heat-caused deterioration or heat-caused shrinkage, resulting in a decrease in strength of cords and the deterioration of tire performance.

In the template printing method, it is difficult to fit a template to a curved surface on which printing is to be carried out, such as the side portion of the tire, without forming any gap between the template and the curved surface. Further, there is a problem that ink spray-coated by a spray gun onto a surface on which printing is to be carried out (which surface will be referred to as the "printing surface" hereinafter) tends to blur at peripheries of letters or the like which have been engraved in the template, so that the peripheries of the printed letters or the like blur, resulting in unsatisfactory clearness.

In the printing method of using a rubber pad, there is a problem that, when a plurality of letters is printed on each side portion of the tire, it takes time to turn the tire over or a problem that, due to the use of ink dissolved in a solvent, ventilation is necessary and constant attention must be paid to keep the operation away from fire.

SUMMARY OF THE INVENTION

In view of the aforementioned facts, an object of the present invention is to solve problems involved in a conventional art and provide a printing device and a printing method capable of effectively printing clear indications on the side portions of a toroidal-shaped body such as a tire.

A first aspect of the present invention is a printing device, comprising: a support means for supporting a toroidal-shaped body; a plurality of transfer film supply means for supplying a transfer film, on the surface of which ink has been applied, to portions in the vicinities of the toroidal-shaped body, the ink exhibiting thermal transferability when heated; and a plurality of transfer means, disposed so as to correspond to the transfer film supply means, for heating the transfer film while pressing the ink applied surface of the transfer film onto a surface of the toroidal-shaped body.

In accordance with the first aspect of the present invention, in the aforementioned printing device, the toroidal-shaped body such as a tire is supported by the support means. And, the transfer film supply means supplies the transfer film onto, for example, the side portions of the toroidal-shaped body.

The transfer means heats the transfer film and presses the ink applied surface of the film onto the surface of the side portion of the tire. Ink is heated to generate transferability, is subjected to a pressing force, and thereby transferred onto the surface of the toroidal-shaped body.

For example, when logo marks are formed with ink beforehand and transferred onto the surface of the toroidal-shaped body, the logo marks are formed (printed) on the surface of the toroidal-shaped body.

In the present invention, since liquid ink is not used in printing, clear indications can be obtained without blurring.

Since there are provided a plurality of the transfer film supply means and a plurality of the transfer means, printing can be carried out simultaneously at a plurality of positions of the toroidal-shaped body.

In a second aspect of the present invention, the support means has a pressure imparting means for imparting pressure to the surface at the opposite side of a printing surface on which printing is to be carried out, of the toroidal-shaped body.

In accordance with the aforementioned second aspect of the present invention, in the printing device, the support means supports the toroidal-shaped body, and imparts pressure to the surface at the opposite side of the printing surface of the toroidal-shaped body.

When the transfer means presses the transfer film onto the side portion which constitutes the printing surface of the toroidal-shaped body, in a state in which pressure is not being imparted to the surface at the opposite side of the printing surface of the toroidal-shaped body, if the toroidal-shaped body is flexible, the side portion is easily deformed so that the ink applied surface of the transfer film may fail to contact the printing surface or may not be pressed onto the printing surface under an appropriate pressure.

However, in a case in which pressure is imparted to the surface at the opposite side of the surface on which printing is to be carried out of the toroidal-shaped body, when the transfer means presses the transfer film onto the side portion of the toroidal-shaped body, the side portion is prevented from deforming, the ink applied surface of the transfer film is reliably made to contact with the surface on which printing is to be carried out of the toroidal-shaped body, and thereby pressed to the surface on which printing is to be carried out under appropriate pressure.

As a result, in accordance with the second aspect of the present invention, ink can reliably be transferred onto the surface on which printing is to be carried out of the toroidal-shaped body.

A third aspect of the present invention is the printing device, including: a storage section for storing a plurality of toroidal-shaped bodies; and a conveying means for supplying the toroidal-shaped bodies stored in the storage section to the support means and for discharging the toroidal-shaped bodies for which printing has been completed from the supporting means.

In accordance with the third aspect of the present invention, the conveying means supplies the toroidal-shaped bodies stored in the storage section to the support means. The toroidal-shaped bodies for which printing has been completed are discharged by the conveying means from the support means.

A fourth aspect of the present invention is the printing device in which the support means includes a detection means for detecting a specified position of the toroidal-shaped body, and positions the toroidal-shaped body at a transfer position, at which ink-transfer is to be performed, on the basis of the specified positions detected by the detection means.

In accordance with the fourth aspect of the present invention, in the printing device, a specified position of the toroidal-shaped body is detected by the detection means. In the case of a tire, preferable examples of such a specified position include indications such as rotation marks which can be detected by an optical sensor, a TV camera, and the like.

On the basis of the results from the detection means, the support means positions the toroidal-shaped body at a transfer position at which ink-transfer is to be performed.

As a result, the aforementioned indications can be printed at predetermined positions based on the specified position of the toroidal-shaped body.

A fifth aspect of the present invention is the printing device, wherein the toroidal-shaped body is a tire rim assembly in which a tire is attached to a rim, and the support means supports the rim.

In accordance with the fifth aspect of the present invention, the rim of the tire rim assembly which constitutes the toroidal-shaped body is supported by the support means so that printing can be carried out, for example, on the side portion of a tire.

A sixth aspect of the present of the present invention is a printing method which comprises steps of imparting pressure to the surface at the opposite side of a surface on which printing is to be carried out, of a toroidal-shaped body; pressing a transfer film being in a state of being heated and having ink that generates transferability due to heating on the surface thereof, to the printing surface on which printing is to be carried out, the surface at the opposite of the printing surface being under a pressure; and thereby transferring the ink of the transfer film onto the surface on which printing is to be carried out.

In accordance with the aforementioned sixth aspect of the present invention, ink that generates transferability due to heating is transferred to the printing surface on which printing is to be carried out, by pressing a transfer film in a state of being heated to the printing surface whose opposite-side surface being under a pressure.

A seventh aspect of the present invention is the printing method further comprising a step of simultaneously transferring the ink of the transfer film onto a plurality of positions of the toroidal-shaped body.

In accordance with the aforementioned seventh aspect of the present invention, ink of the transfer film is simultaneously transferred onto a plurality of positions of the toroidal-shaped body.

An eighth aspect of the present invention is the printing method further comprising a step of disposing the transfer film such that the transfer film faces each of axial direction side surfaces of the toroidal-shaped body and then simultaneously transferring the ink of the transfer film on both of the axial direction side surfaces of the toroidal-shaped body.

In accordance with the eighth aspect of the present invention, the transfer film is disposed so as to face each of the axial direction side surfaces of the toroidal-shaped body, and ink of the transfer film is simultaneously transferred on both axial direction side surfaces of the toroidal-shaped body. Therefore, printing can be effectively carried out on both axial direction side surfaces of the toroidal-shaped body.

A ninth aspect of the present invention is the printing method further comprising a step of sequentially shifting a strip-shaped transfer film and transferring said ink onto said transfer film.

In accordance with the aforementioned ninth aspect of the present invention, when another toroidal-shaped body is positioned at the transfer position, in place of the toroidal-shaped body having ink already transferred thereon, after ink of the transfer film has been transferred onto the toroidal-shaped body, the transfer film is shifted such that a portion of the transfer film having ink thereon faces the another toroidal-shaped body and another printing or transfer process can be carried out.

When a sheet type transfer film is used, the transfer sheet must be changed for each toroidal-shaped body so that the changing operation becomes troublesome. On the other hand, in the printing method according to the ninth aspect of the present invention, the printing process can be repeated or continuously performed for a plurality of toroidal-shaped bodies only by shifting the transfer film, whereby the operation is made easy.

A tenth aspect of the present invention is the printing method wherein the toroidal-shaped body is a tire rim assembly in which a tire is attached to a rim and the method further comprising a step of carrying out a transfer in a state in which internal pressure is imparted into the tire.

In accordance with the tenth aspect of the present invention, printing can be carried out, for example, on the side portion of the tire of the tire rim assembly.

Further, when internal pressure is imparted into a tire, rigidity of the side portion of the tire becomes high. Accordingly, when the transfer film is pressed to the side portion of the tire, ink can reliably be transferred onto the tire side portion.

DESCRIPTION OF THE PREFERRED EMBODIMENTS

With reference to FIGS. 1 to 5, an embodiment of a printing device of the present invention will be explained as a tire printing device hereinafter.

Figure 2:
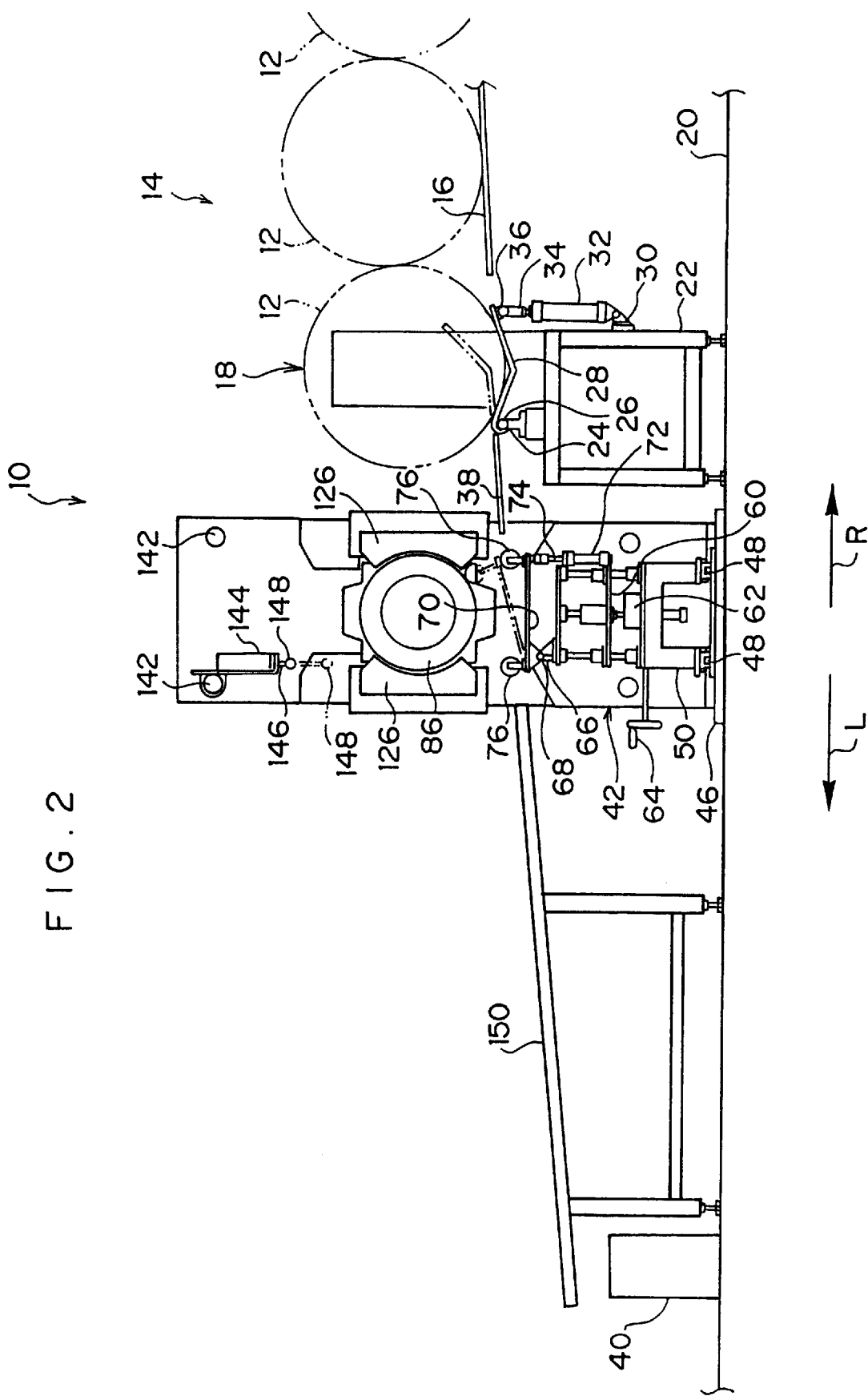
FIG. 2 is an overall structural view illustrating the printing device according to the embodiment of the present invention.

As shown in FIG. 2, in a tire printing device 10 as a printing device of the present invention, there is provided a storage section 14 for storing a plurality of tires 12 at the "R" side of FIG. 2 (which will be referred to "the "R" side" hereinafter). The storage section 14 is provided with a tilt platform 16 on which a plurality of the tires 12 is placed in a row. The tilt platform 16 is lowered at the left hand side thereof.

Tire supply device

A tire supply device 18 is disposed in the vicinity of the storage section 14 at the "L" side of FIG. 2 (which will be referred to as "the "L" side" hereinafter).

The tire supply device 18 has a main body portion 22 that is installed on a floor surface 20.

At the upper portion of the main body portion 22, there is disposed a bearing 24. One end of a tire loading plate 28 for loading the tire 12 thereon is supported by a shaft 26 which is supported by this bearing 24, thus enabling the tire loading plate 28 to swing.

The tire loading plate 28 is formed into a substantially V-shape.

The main body portion 22 is provided with an air cylinder support portion 30 on the side surface thereof at the storage section 14 side. An air cylinder 32 is supported by the air cylinder support portion 30 so as to be able to swing.

The tip end portion of a piston rod 34 of the air cylinder 32 is connected to the other end of the tire loading plate 28 via a pin 36.

At the upper portion of the main body portion 22, there is disposed a guide plate 38 at the "L" side of the bearing 24.

An operation of the air cylinder 32 is controlled by a controller 40.

Tire loading stand

A tire loading stand 42 is provided at the "L" side of the tire supply device 18.

Figure 1:
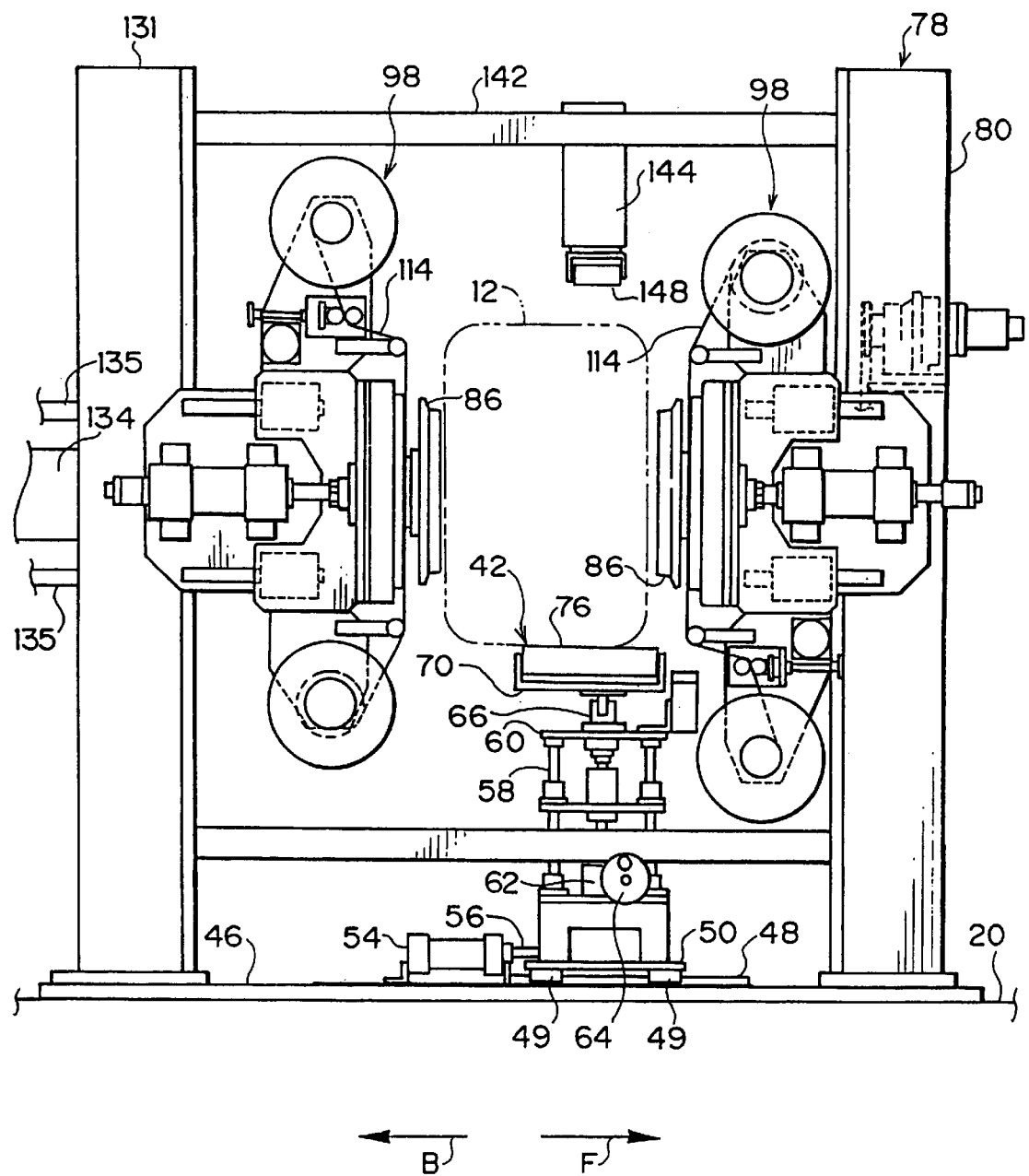
FIG. 1 is a side view illustrating portions in the vicinities of thermal transfer printers and a tire loading stand in a printing device according to an embodiment of the present invention.

As shown in FIGS. 1 and 2, the tire loading stand 42 is provided with a base plate 46 which is installed on the floor surface 20. A pair of guide rails 48 which extend horizontally in a direction orthogonal to the "R" and "L" directions in FIG. 2 (i.e., a thickness direction of FIG. 2 or the direction of arrow F and the direction of arrow B in FIG. 1) is mounted to the base 46.

A transversely movable frame 50 (which will be referred to as a "frame 50" hereinafter) is supported by the guide rails 48 via linear bearings 49.

At the upper portion of the base plate 46 is disposed an air cylinder 54 having a piston rod 56 whose tip end portion engages with the frame 50.

Therefore, by extending/retracting the piston rod 56, the position of the frame 50 can be controlled both in the direction of arrow B and in the direction of arrow F.

A plurality of guide shafts 58 is disposed vertically at the frame 50. A vertically moving frame 60 (which will be referred to as a "frame 60" hereinafter) is supported by the guide shafts 58 so as to be slidable.

A screw jack 62 is disposed at the frame 50. By rotating a handle 64 of the screw jack 62, the height position of the frame 60 can be adjusted.

A bearing 66 is disposed at the upper portion of the frame 60. One end of a tire loading plate 70 for loading a tire 12 thereon is supported by a shaft 68 supported by this bearing 66, thus enabling the tire loading plate 70 to swing.

An air cylinder 72 is disposed vertically at the "R" side of the frame 60.

The tip end portion of a piston rod 74 of the air cylinder 72 abuts the other end bottom surface of the tire loading plate 70.

The air cylinder 72 is controlled by the controller 40.

At the upper portion of the tire loading plate 70 is disposed a pair of rollers 76 so as to be spaced apart from each other. Each of the rollers 76 is disposed horizontally and has a rotation axis whose lengthwise direction corresponds to a direction orthogonal to the direction of arrow R and the direction of arrow L.

As shown in FIG. 1, a gate-shaped frame 78 is disposed on the floor surface 20.

Figure 3:
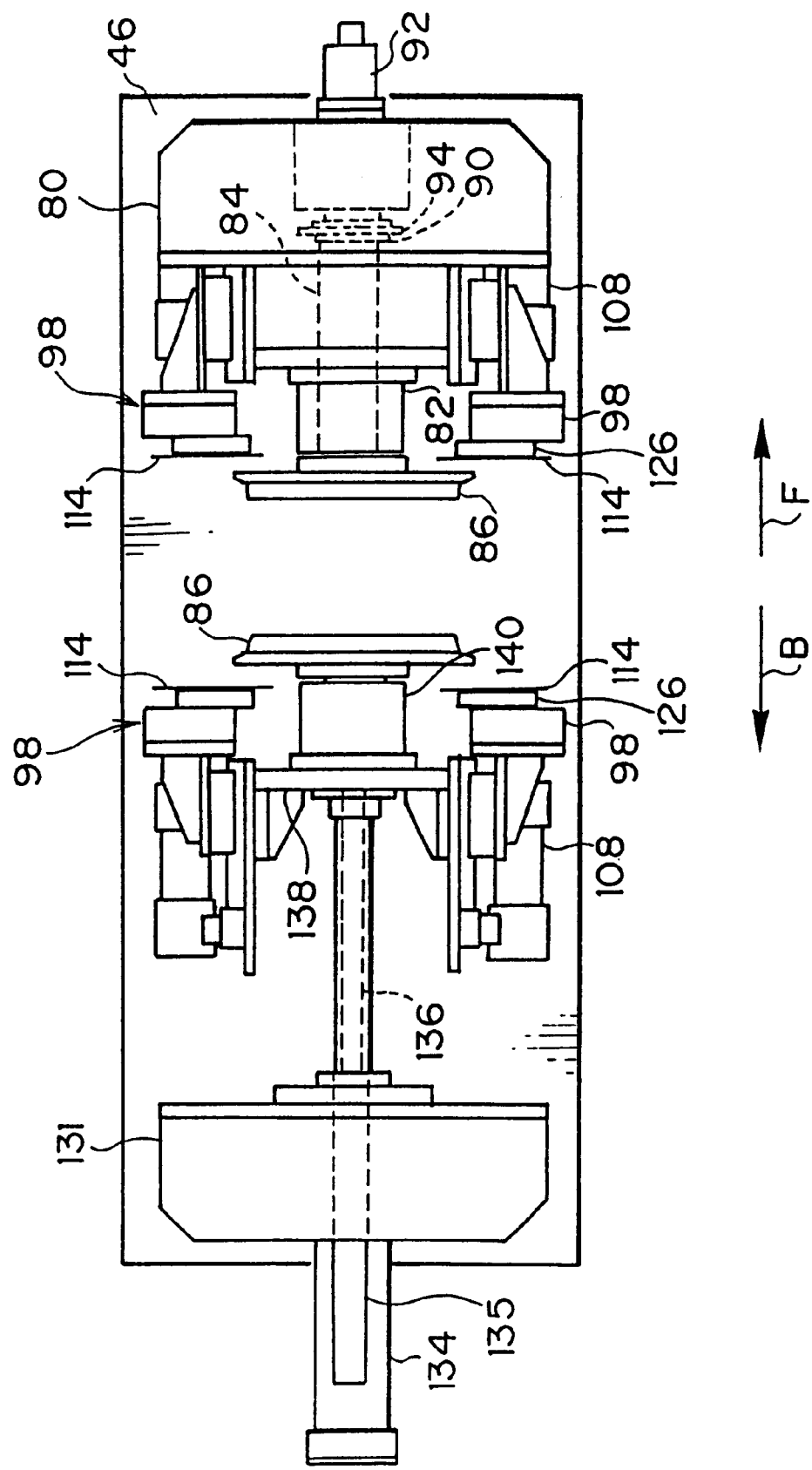
FIG. 3 is a plan view illustrating portions in the vicinities of the thermal transfer printers in the printing device according to the embodiment of the present invention.
Figure 4:
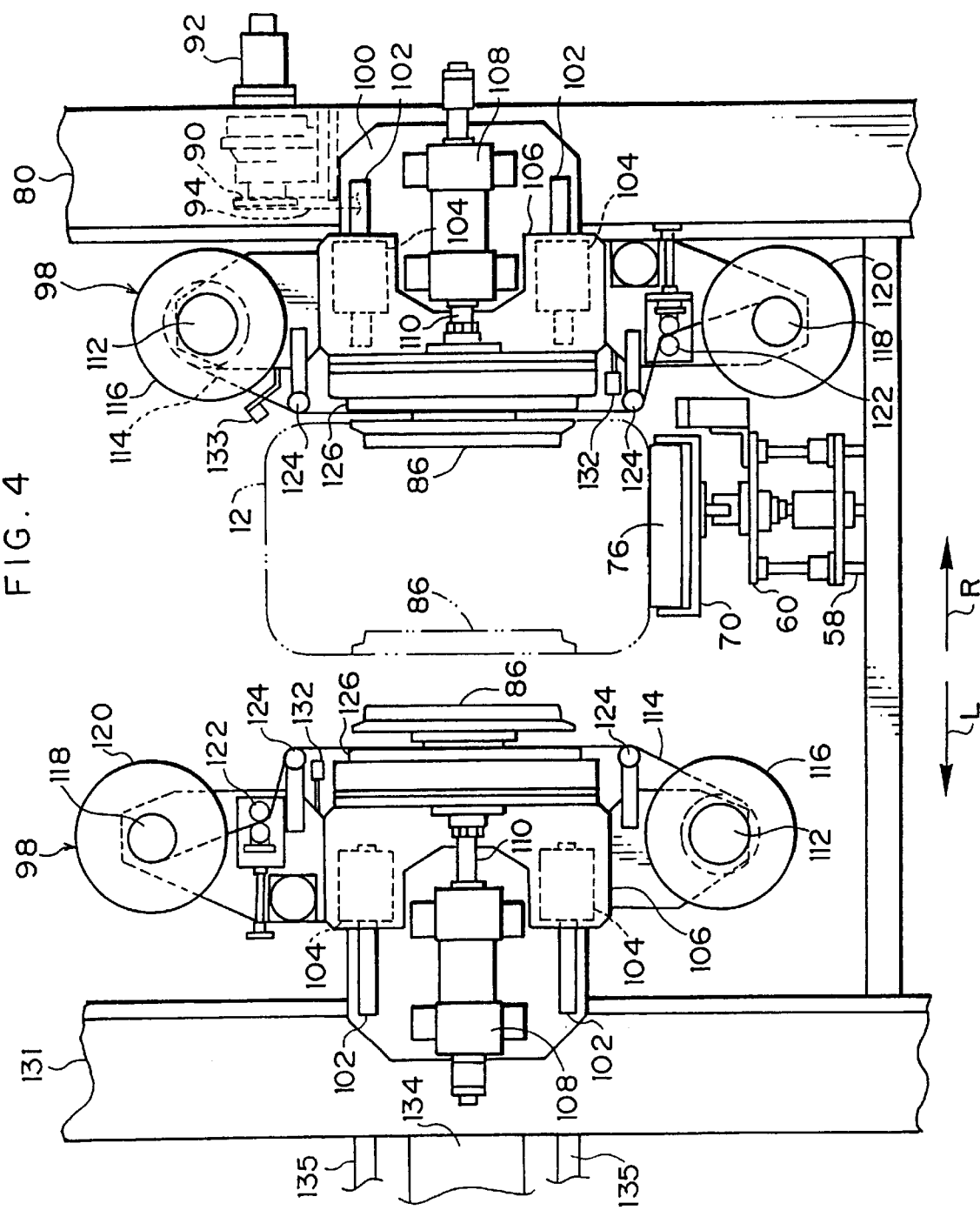
FIG. 4 is a side view illustrating portions in the vicinities of the thermal transfer printers in the printing device according to the embodiment of the present invention.

As shown in FIGS. 3 and 4, there are provided a support 80 and a support131 (which will be described later) for forming the gate-shaped frame 78. The support 80 is disposed at the "F" side of FIG. 1 (which will be referred to as "the "F" side" hereinafter) of the gate-shaped frame 78 and has a bearing 82 by which a rotation axis 84 is rotatably supported.

At one end of the rotation axis 84 is disposed a bead portion support member 86 for engaging with one of the bead portions of the tire 12.

This bead portion support member 86 is formed into the substantially same disc-shaped configuration as one of the halves of a rim which would be obtained by cutting the rim at the center portion in the widthwise direction thereof.

At the shaft core portion of the rotation axis 84, is formed a passage (not shown) which supplies air. One end of the air passage formed inside the bead portion support member 86 is opened outside at the "B" side in FIG. 3.

To the other end of the rotation axis 84 is connected one end of an air pipe (not shown) via a free joint (not shown). Further, to the intermediate portion of the air pipe is connected a switch valve (not shown), and to the other end of the air pipe is connected an air compressor (not shown). Moreover, the switch valve is controlled by the controller 40.

The support 80 is provided with a motor 92 having a sprocket 90 mounted on the rotation axis thereof.

An unillustrated sprocket is mounted to the rotation axis 84 at the other end side thereof. An endless chain 94 is entrained between the sprocket 90 of the motor 92 and the sprocket of the rotation axis 84.

Accordingly, due to the rotation of the motor 92, the rotation axis 84 can be rotated. The rotation of the motor 92 is controlled by the controller 40.

Thermal transfer printer

As shown in FIG. 3, a thermal transfer printer 98 is disposed at each side of the support 80 so as to interpose the rotation axis 84 therebetween.

As shown in FIGS. 3 and 4, the thermal transfer printer 98 is provided with a base plate 100 which is mounted on the side surface of the support 80. A pair of guide rails 102 is mounted horizontally to the base plate 100. A moving base 106 is supported by the pair of the guide rails 102 by way of linear bearings 104.

A hydraulic cylinder 108 is horizontally mounted on the base plate 100. One end of a piston rod 110 engages with the moving base 106.

At the upper portion of the moving base 106 is provided a supply side reel support shaft 112. To this supply side reel support shaft 112 is detachably mounted a supply reel 116 around which a transfer film 114 has been wound.

At the lower portion of the moving base 106 is provided a take-up side reel support shaft 118. To this take-up side reel support shaft 118 is detachably mounted a take-up reel 120.

Further, at the lower portion of the moving base 106 is provided a pair of nipping rollers 122 for nipping the transfer film 114 and withdrawing the same toward the take-up reel 120.

The nipping rollers 122 and the take-up reel 120 are rotated by an unillustrated motor so as to pull the transfer film 114 out from the supply reel 116 and take up the transfer film 114 onto the take-up reel 120. Further, the motor for rotating the nipping rollers 122 and the take-up reel 120 is connected to the controller 40 and the rotation thereof is controlled by the controller 40.

At the upper and lower portions of the moving base 106 is disposed a pair of guide rollers 124 for guiding the transfer film 114 between the pair of the nipping rollers 122 and the take-up reel 120 in a vertical direction.

Figure 5:
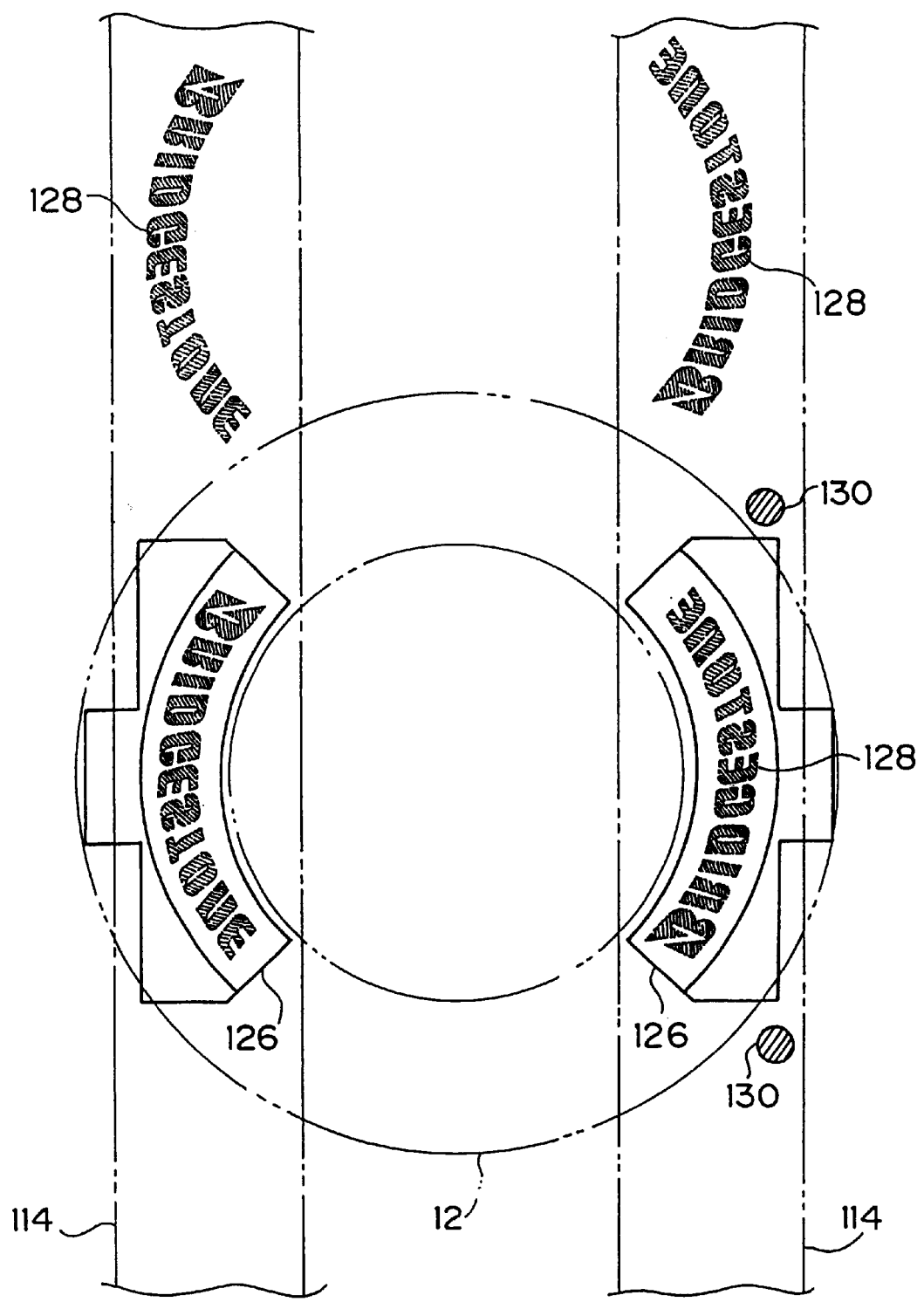
FIG. 5 is a front view illustrating thermal plates and transfer films.

At the side opposite to the tire 12 side of the transfer film 114 which is guided by the pair of the guide rollers 124, an arcuate thermal plate 126 as is shown in FIG. 5 is disposed parallel to the transfer film 114.

A thermal plate 126 is heated by an unillustrated heater.

The thermal transfer film 114 is constructed such that white logo marks 128 are printed on one side of a heat-resistant resin film (which side is opposite to thermal plate 126 side of the film) at a predetermined interval.

The logo marks 128 are printed with ink that does not show transferability at the room temperature or so but shows the transferability when it is heated (e.g., at the temperature of 100° C. or more).

Ink such as rubber-based ink, synthetic resin-based ink or the like that rolls well even in a solid state is preferable.

Registration marks 130 are printed on the transfer film 114 at the same predetermined intervals as the logo marks 128.

As shown in FIG. 4, the registration marks 130 are detected by an optical sensor 132 which is provided at the moving base 106.

The optical sensor 132 is connected to the controller 40, and controlled by the controller 40 such that, for instance, the optical sensor 132 reliably detects the registration marks 130 when the transfer film 114 comes to the position (the transfer position) at which the logo marks 128 face the portions of the tire 12 on which the logo marks 128 are to be printed or transferred.

At the moving base 106 is disposed a TV camera 133 for detecting rotation marks that are provided at the side portions of the tire 12. The TV camera 133 is connected to the controller 40.

As shown in FIGS. 3 and 4, a hydraulic cylinder 134 and a pair of guide shafts 135 are disposed at another support 131.

The pair of the guide shafts 135 is supported by a bearing disposed at the support 131 so as to be able to slide freely both in the direction of arrow F and the direction of arrow B.

A moving frame 138 is mounted to the "F" side ends of the guide shafts 135.

A piston rod 136 of the hydraulic cylinder 134 is mounted to the moving frame 138. By extending/retracting the piston rod 136, the moving frame 138 can be moved both in the direction of arrow F and in the direction of arrow B.

The hydraulic cylinder 134 is controlled by the controller 40.

The thermal transfer printer 98 is disposed at each side of the moving frame 138 so as to interpose the hydraulic cylinder 134 therebetween. Accordingly, four thermal transfer printers 98 are provided in the present embodiment.

At the moving frame 138 is disposed a bearing 140 by which a shaft having the bead portion support member 86 mounted thereon (not shown) is rotatably supported.

At the upper portion of the gate-shaped frame 78 is disposed a horizontal beam 142. An air cylinder 144 is disposed so as to cross the beam 142 thus allowing a piston rod 146 to downwardly extend/upwardly retract. At the lower end of the piston rod 146 is mounted a stopper roller 148 that abuts the tire 12 to prevent the tire 12 from moving. An operation of this air cylinder 144 is controlled by the controller 40.

Conveying platform

At the "L" side (refer to FIG. 2) of the tire loading stand 42 is disposed a conveying platform 150 for conveying the tire 12 having logo marks printed thereon in the direction of arrow L.

Operation

An operation of the tire printing device 10 according to the present embodiment will be explained hereinafter.

In the storage section 14, the tires 12 on which logo marks are to be printed are placed in a row on the tilt platform 16. As the tilt platform 16 is inclined such that the "L" side thereof is lowered, the tires 12 at the "L" side of the storage section 14 are sequentially rolled over farther in the direction of arrow L and disposed on the tire loading plate 28 of the tire supply device 18.

As the tire loading plate 28 is formed in a substantially V-shape, each of the tires 12 which have rolled over stops at the concave portion of the V-shape.

When the piston rod 34 of the air cylinder 32 at the tire supply device 18 is extended to thereby tilt the tire loading plate 28, the tires 12 on the tire loading plate 28 are rolled over in the direction of the tire loading stand 42 that is disposed adjacent to the tire loading plate 28 via the guide plate 38, and are loaded on the pair of the rollers 76 on the tire loading plate 70.

When the tire loading plate 28 of the tire supply device 18 is made to tilt, the piston rod 146 of the air cylinder 144 which is disposed at the upper portion of the gate-shaped frame 78 is extended downwardly to thereby set the stopper roller 148 at a lower position.

The tire 12, which has reached the tire loading stand 42, abuts the stopper roller 148 which prevents the tire 12 from moving further in the direction of arrow L.

The tire loading plate 70 is adjusted in height beforehand by using the screw jack 62 such that the center of rotation of the tire 12 loaded thereon corresponds to that of the bead portion support member 86.

Next, the piston rod 136 of the hydraulic cylinder 134 provided at the support 131 is extended in the direction of arrow F, such that a pair of the bead portion support members 86 nips the tire 12 therebetween and portions in the vicinities of outer periphery of the bead portion support members 86 come into contact with the bead portions of the tire 12.

Therefore, the inside of the tire 12 is air-tightly sealed.

Next, air from a compressor is supplied into the tire 12 to thereby maintain the internal pressure inside of the tire 12 at a predetermined level.

Next, the motor 92 is operated to thereby rotate the tire 12 nipped by the bead portion support members 86.

When the rotation marks which are provided at the side portions of the tire 12 are detected by the TV camera 133, the rotation of the motor 92 is stopped and the tire 12 is positioned at the position in the rotational direction thereof (the transfer position) at which logo marks will be printed or transferred on the tire 12.

When the positioning of the tire 12 has been completed, the take-up reel 120 and the nipping rollers 122 are rotated to thereby take up the transfer film 114 from the supply reel 116.

When the registration marks 130 on the transfer film 114 were detected by the optical sensor 132, the rotation of the take-up reel 120 and the nipping rollers 122 is stopped, whereby the logo marks 128 of the transfer film 114 stop in front of the portions of the tire 12 where the logo marks 128 are to be printed (see FIG. 5).

Next, the piston rods 110 of the hydraulic cylinders 108 are extended forward, whereby the transfer film 114 is pressed on the side portions of the tire 12 by the thermal plate 126.

The transfer film 114 is heated by the thermal plates 126, and the logo marks 128 is transferred to the side portions of the tire 12.

Since the tire 12 has been inflated at a predetermined internal pressure, the pressing pressure of the thermal plate 126 reliably acts upon the logo marks 128 of the transfer film 114 thus allowing the logo marks 128 to reliably transfer onto the side portions of the tire 12.

A predetermined internal pressure of the tire 12 may be a minimum pressure at which the logo marks 128 can reliably be transferred.

In the present embodiment, since liquid ink is not used in printing, clear indications can be obtained without blurring.

In the present embodiment, since total four thermal transfer printers 98 are provided by disposing two thermal transfer printers 98 respectively at both sides of the tire 12, the logo marks 128 can simultaneously be printed at four positions of the tire 12.

After the transfer of the logo marks 128 has been completed, the piston rods 110 of the hydraulic cylinders 108 are withdrawn, such that the thermal plates 126 are moved in a direction in which the thermal plates 126 separate from the tire 12.

A switch valve which is disposed on a path of an unillustrated pipe is switched, so that the inside of the tire 12 communicates with the atmosphere and the internal pressure of the tire 12 is reduced to an atmospheric pressure. Thereafter, the piston rod 136 of the hydraulic cylinder 134 is retracted, whereby the bead portion support member 86 at the support 131 side is separated from the tire 12.

Thereafter, the piston rod 146 of the air cylinder 144 is retracted, the stopper roller 148 retracts upward, and the piston rod 74 of the air cylinder 72 on the tire loading stand 42 is extended, whereby the tire loading plate 70 is tilted.

The tire 12 on which the logo marks 128 have been printed rolls over onto the conveying platform 150 in the direction of arrow L.

In the same manner as the above-description, by sequentially conveying the tires 12 stored, printing of the logo marks 128 on the tire 12 is carried out.

In the tire printing device 10 of the present embodiment, as described above, as the logo marks 128 can automatically be printed at four positions per a single tire, it is possible to print the logo marks 128 effectively on a number of the tires 12.

Further, in the aforementioned present embodiment, an example in which white logo marks 128 are printed on the side portions of the tire 12 has been explained. However, the present invention is not limited to this, and additionally, indications such as letters, numbers, and patterns can be printed. Needless to say, ink of other colors than white can be used.

Moreover, in the aforementioned present embodiment, the logo marks 128 are provided on the transfer film 114 at a predetermined interval. However, ink may be applied to the entire surface of one side of the film 114. In this case, the surface of the thermal plate 126 may be formed into a letterpress printing plate or an intaglio printing plate-like structure so that indications such as logo marks, letters, numbers, patterns, and the like can be printed on the tire 12 in a manner of the letterpress or intaglio printing.

Further, in the aforementioned embodiments, the tire 12 was used as an object to be printed. However, the present invention is not limited to this tire. As a matter of the fact, indications can be printed on any toroidal-shaped bodies except a tire, such as a tube, a roll, a float, a rubber boat main portion, and the like.

As described above, in short, in accordance with the printing device and the printing method of the present invention, an excellent effect can be provided in that indications can be printed clearly and effectively on the side portions of a toroidal-shaped body such as a tire.

What is claimed is:

1. A printing device, comprising:
   a support means for supporting a toroidal-shaped body;
   a plurality of transfer film supply means for supplying a transfer film, on a surface of which ink has been applied, to portions in the vicinities of the toroidal-shaped body, the ink exhibiting thermal transferability when heated; and
   a plurality of transfer means, disposed so as to correspond to said transfer film supply means, for heating said transfer film while pressing the ink applied surface of said transfer film onto a surface of said toroidal-shaped body,
   wherein said support means comprises a pressure imparting means for imparting an internal air pressure to a surface at an opposite side of said surface on which printing is to be carried out, of the toroidal-shaped body.

2. The printing device according to claim 1, further comprising:
   a storage section for storing a plurality of toroidal-shaped bodies; and
   a conveying means for supplying the toroidal-shaped bodies stored in said storage section to said support means and for discharging said toroidal-shaped bodies for which printing has been completed from said support means.

3. The printing device according to claim 2, wherein said support means further comprises a detection means for detecting a specified position of said toroidal-shaped body, and positions the toroidal-shaped body at a transfer position, at which ink transfer is to be carried out, on the basis of said specified position detected by said detection means.

4. The printing device according to claim 3, wherein said transfer film supply means comprises another detection means for detecting a specified position of said transfer film, and positions the transfer film at a transfer position, at which ink transfer is to be carried out, on the basis of said specified position detected by said another detection means.

5. The printing device according to claim 4, wherein said transfer film supply means supplies said transfer film to a portion in the vicinity of the toroidal-shaped body such that the transfer position of said transfer film corresponds to the transfer position of said toroidal-shaped body.

6. The printing device according to claim 1, wherein said toroidal-shaped body is a tire rim assembly in which a tire is attached to a rim, and said support means supports the rim.

7. The printing device according to claim 6, further comprising:
   a storage section for storing a plurality of toroidal-shaped bodies; and
   a conveying means for supplying the toroidal-shaped bodies stored in said storage section to said support means and for discharging the toroidal-shaped bodies for which printing has been completed from said support means.

8. The printing device according to claim 7, wherein said support means further comprises a detection means for detecting a specified position of said toroidal-shaped body, and positions the toroidal-shaped body at a transfer position, at which ink transfer is to be carried out, on the basis of said specified position detected by said detection means.

9. The printing device according to claim 8, wherein said transfer film supply means comprises another detection means for detecting a specified position of said transfer film, and positions the transfer film at a transfer position, at which ink transfer is to be carried out, on the basis of said specified position detected by said another detection means.

10. The printing device according to claim 9, wherein said transfer film supply means supplies said transfer film to a portion in the vicinity of the toroidal-shaped body such that the transfer position of said transfer film corresponds to the transfer position of said toroidal-shaped body.

11. A printing device, comprising:
   a support means for supporting a toroidal-shaped body such that a printing region, in which printing is to be carried out, of a surface of the toroidal-shaped body is positioned at a predetermined position;
   a transfer film supply means for supplying a transfer film which contains a transfer region in which ink having thermal transferability is applied on the surface thereof, such that said transfer region of the transfer film corresponds to the printing region of the surface of the toroidal-shaped body; and
   a transfer means which is disposed so as to correspond to said transfer film supply means and which heats said transfer region of said transfer film and transfers thermally transferable ink onto said printing region of said surface of said toroidal-shaped body,
   wherein said support means comprises a pressure imparting means for imparting an internal air pressure to a surface at an opposite side of said surface on which printing is to be carried out, of the toroidal-shaped body.

12. The printing device according to claim 11, further comprising:
   a storage section for storing a plurality of toroidal-shaped bodies; and
   a conveying means for supplying the toroidal-shaped bodies stored in said storage section to said support means and for discharging the toroidal-shaped bodies for which printing has been completed from said support means.

13. The printing device according to claim 11, wherein said support means detects a specified position of said toroidal-shaped body, and positions the toroidal-shaped body at a transfer position, at which ink transfer is to be carried out, on the basis of the specified position thus detected.

14. The printing device according to claim 11, wherein said transfer film supply means detects a specified position of said transfer film, and positions the transfer film at a transfer position, at which ink transfer is to be carried out, on the basis of said specified position thus detected.

15. A printing method, comprising the steps of:
   (a) providing a support for a toroidal-shaped body, said support having pressure imparting structure;
   (b) imparting, with said pressure imparting structure, an internal air pressure to a surface at an opposite side of a surface on which printing is to be carried out, of said toroidal-shaped body;
   (c) pressing a transfer film being in a state of being heated and having ink that generates transferability due to heating on the surface thereof, to a printing surface on which printing is to be carried out, the surface at the opposite side of the printing surface being under said internal air pressure; and
   (d) thereby transferring the ink of the transfer film onto the printing surface.

16. The printing method according to claim 15, further comprising a step of simultaneously transferring said ink of said transfer film onto a plurality of positions of said toroidal-shaped body.

17. The printing method according to claim 15, further comprising a step of disposing two transfer films to respectively face opposite axial direction side surfaces of the toroidal-shaped body and then simultaneously transferring the ink of the transfer on the axial direction side surfaces of the toroidal-shaped body.

18. The printing method according to claim 15, further comprising a step of sequentially shifting said transfer film formed in a strip and transferring said ink onto said printing surface.

19. The printing method according to claim 15, wherein said toroidal-shaped body is a tire rim assembly in which a tire is attached to a rim and further comprising a step of carrying out said transfer in a state in which internal pressure is imparted into said tire.

* * * * *